United States Patent

Takita

Patent Number: 5,721,684
Date of Patent: Feb. 24, 1998

[54] NAVIGATION APPARATUS HAVING TWO PROCESSORS, THE FIRST FOR OUTPUTTING MAP DATA AND THE SECOND FOR DRAWING AND SCROLLING THE MAP

[75] Inventor: Hiroki Takita, Tokyo, Japan

[73] Assignee: Mitsubishi Denki Kabushiki Kaisha, Tokyo, Japan

[21] Appl. No.: 558,693

[22] Filed: Nov. 14, 1995

[30] Foreign Application Priority Data

Jul. 4, 1995 [JP] Japan ................... 7-168994

[51] Int. Cl.⁶ .................... G09B 29/10; G01C 21/00
[52] U.S. Cl. ................. 364/443; 364/449.2; 340/995
[58] Field of Search ................ 364/449.2, 449.5, 364/449.6; 340/995; 345/123, 125, 190; 395/200.03, 474, 501, 507, 512

[56] References Cited

U.S. PATENT DOCUMENTS

| | | | |
|---|---|---|---|
| 4,849,827 | 7/1989 | Hashimoto et al. | 358/342 |
| 4,953,082 | 8/1990 | Nomura et al. | 364/200 |
| 5,020,003 | 5/1991 | Moshenberg | 364/518 |
| 5,124,924 | 6/1992 | Fukushima et al. | 364/449 |
| 5,212,643 | 5/1993 | Yoshida | 364/449 |
| 5,299,309 | 3/1994 | Kuo et al. | 395/162 |
| 5,406,493 | 4/1995 | Goto et al. | 364/449 |
| 5,568,390 | 10/1996 | Hirota et al. | 364/449 |
| 5,587,911 | 12/1996 | Asano et al. | 364/444.2 |

FOREIGN PATENT DOCUMENTS 2 140789  5/1990  Japan .

Primary Examiner—Michael Zanelli
Attorney, Agent, or Firm—Burns, Doane, Swecker & Mathis, LLP

[57] ABSTRACT

A navigation apparatus has a main processor and a graphic processor. Drawing attribute data for drawing a map, and scroll attribute data for scrolling the map are sent from the main processor to the graphic processor. The graphic processor performs a map drawing process and a map scroll process, and the main processor performs other processes.

13 Claims, 5 Drawing Sheets

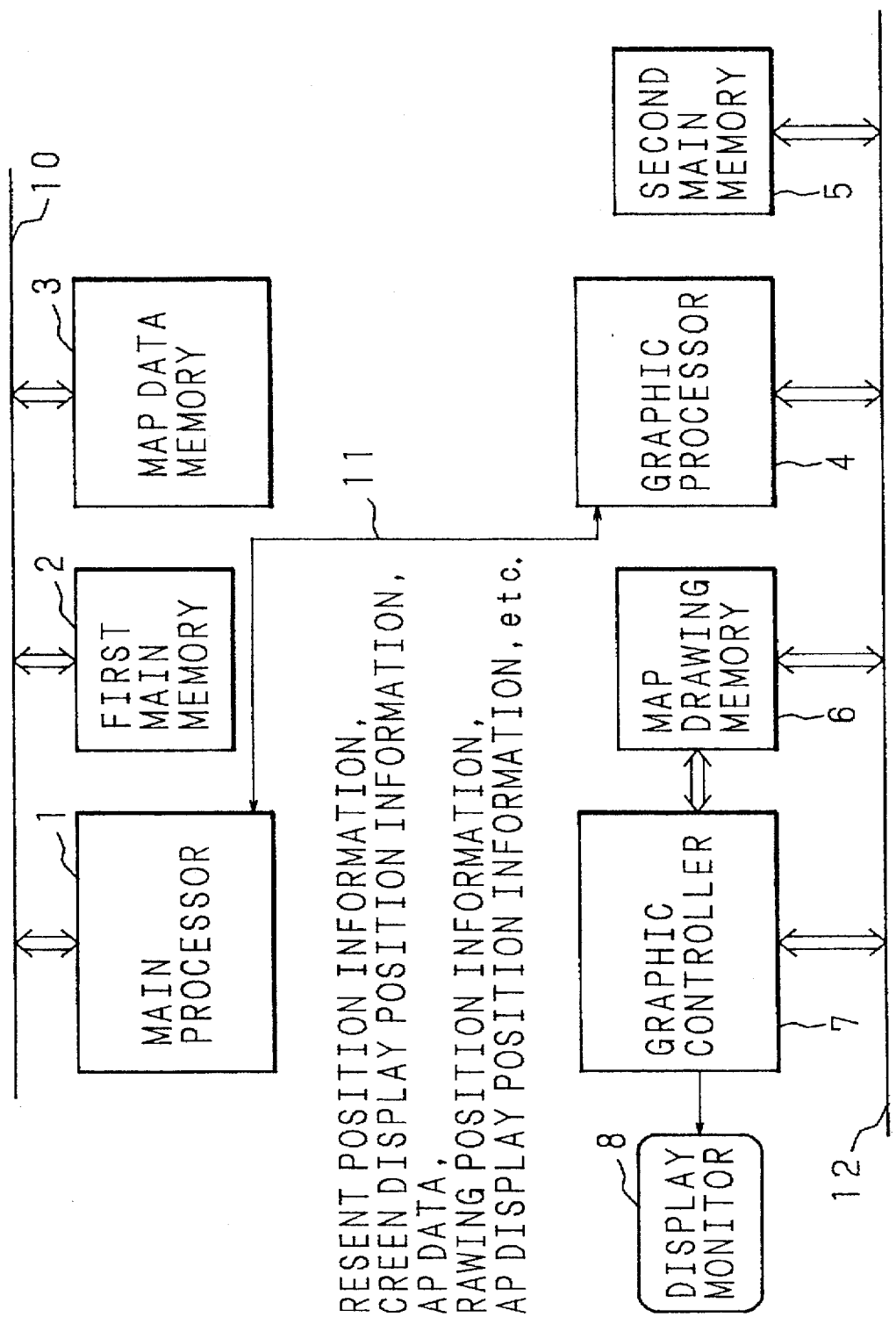

NAVIGATION APPARATUS HAVING TWO PROCESSORS, THE FIRST FOR OUTPUTTING MAP DATA AND THE SECOND FOR DRAWING AND SCROLLING THE MAP

BACKGROUND OF THE INVENTION

1. Field of the Invention

The invention relates to a navigation apparatus for a vehicle.

2. Description of Related Art

A navigation apparatus has been developed which provides a moving vehicle with position information such as road information in order to guide the vehicle to the destination correctly and rapidly. Such a navigation apparatus for a vehicle is a system in which information of the present position of the vehicle is obtained from a position detecting mechanism such as the GPS (Global Positioning System), map data corresponding to the obtained position information are read out from various kinds of map data stored in a CD-ROM, a map is displayed on a monitor screen, and the position of the vehicle is automatically displayed on the map. When the navigation apparatus is used, a road map is not required. Furthermore, when further detailed data for each destination are additionally displayed on a map, it is possible to enhance the utility value of the apparatus.

FIG. 1 is a diagram showing the configuration of such a prior art navigation apparatus. In FIG. 1, 21 designates a data bus, and 22 designates a main processor. The main processor 22 processes information obtained from the GPS, a vehicle speed sensor, a gyrocompass, a key input unit, etc. by using a main memory 23, thereby obtaining present position information of the vehicle. Map data corresponding to the obtained present position information are read out from a map data memory 24 consisting of a CD-ROM in which various kinds of map data are previously stored. In accordance with the map data, a map is drawn in a map drawing memory 25. A graphic controller 26 captures the map information drawn in the map drawing memory 25, and supplies the information to a display monitor 27 so that the map is displayed on the display monitor 27.

In addition to the above-described present position process and map drawings process, the main processor 22 performs a scroll process for the displayed map, and a route search process in which the route to be traced is searched. In the case where traffic information indicating the traffic jam condition is to be received from the VICS (Vehicle Information Communication System), the main processor 22 must process also the traffic information. It is expected that the amount of information to be processed by the main processor 22 is further increased and also the number of kinds of information to be processed by the main processor 22 is enlarged.

As described above, in a navigation apparatus, there are tendencies to increase the amount of information to be inputted and also the number of processes to be executed. In the prior art configuration, the sole processor (the main processor 22 shown in FIG. 1) must perform all the processes. Therefore, the prior art apparatus cannot sufficiently cope with all the processes. During a period when the route search process is executed or traffic jam information from the VICS is processed, for example, the displayed map cannot be scrolled and the process step is delayed.

Japanese Patent Application Laid-Open No. 2-140789 (1990) discloses a navigation apparatus using a technique which may relate to the invention. The disclosed navigation apparatus has a main circuit unit which performs various processes, and a subcircuit unit which writes map data obtained from a CD-ROM storing a large amount of map data, into a common RAM. The process of accessing the CD-ROM, and that of drawing a map can be executed in parallel. Also the prior art navigation apparatus cannot rapidly perform various processes which are increasing in kind and number.

SUMMARY OF THE INVENTION

It is an object of the invention to provide a navigation apparatus in which a processor for performing a map drawing process and a scroll process is additionally disposed so that the load on the existing main processor can be reduced.

It is another object of the invention to provide a navigation apparatus in which a map drawing process and a scroll process can be performed in parallel to a route search process so that various processes are rapidly performed.

A navigation apparatus of the invention has a first processor (main processor), and a second processor (graphic processor). Drawing attribute data for drawing a map, and scroll attribute data for scrolling the map are sent from the first processor to the second processor. The second processor performs a map drawing process and a scroll process, and the first processor performs other processes. In the navigation apparatus, both the first processor (main processor) and the second processor (graphic processor) can access a map data memory which stores map data, and can read out the map data.

Another navigation apparatus of the invention has a map data memory, a first processor (main processor), a second processor (graphic processor), and a common memory. The first processor captures map data from the map data memory, and writes the map data, drawing attribute data, and scroll attribute data into the common memory. The second processor reads out these data from the common memory, and performs a map drawing process and a scroll process. The first processor performs other processes.

A further navigation apparatus of the invention has a map data memory, a first processor (main processor), and a second processor (graphic processor). The first processor captures map data from the map data memory, and sends the map data, drawing attribute data, and scroll attribute data to the second processor. The second processor performs a map drawing process and a scroll process. The first processor performs other processes.

In order to perform a map drawing process and a scroll process, the navigation apparatus of the invention has the second processor (graphic processor) in addition to the existing first processor (main processor). Therefore, the load on the first processor (main processor) can be reduced as compared with the prior art apparatus. Even during a period when the first processor performs the route search process, the map drawing process and the scroll process which are executed by the second processor are not affected by the route search process. Consequently, the map drawing process and the scroll process can be performed in parallel to the route search process. Even when the number of processes to be executed is increased, therefore, it is possible to rapidly perform these processes.

The above and further objects and features of the invention will more fully be apparent from the following detailed description with accompanying drawings.

BRIEF DESCRIPTION OF THE DRAWINGS

FIG. 5 is a diagram showing the configuration of a navigation apparatus of a fourth embodiment.

DESCRIPTION OF THE PREFERRED EMBODIMENTS

Hereinafter, the invention will be described in detail with reference to the drawings showing its embodiments.

[First Embodiment]

Figure 1:
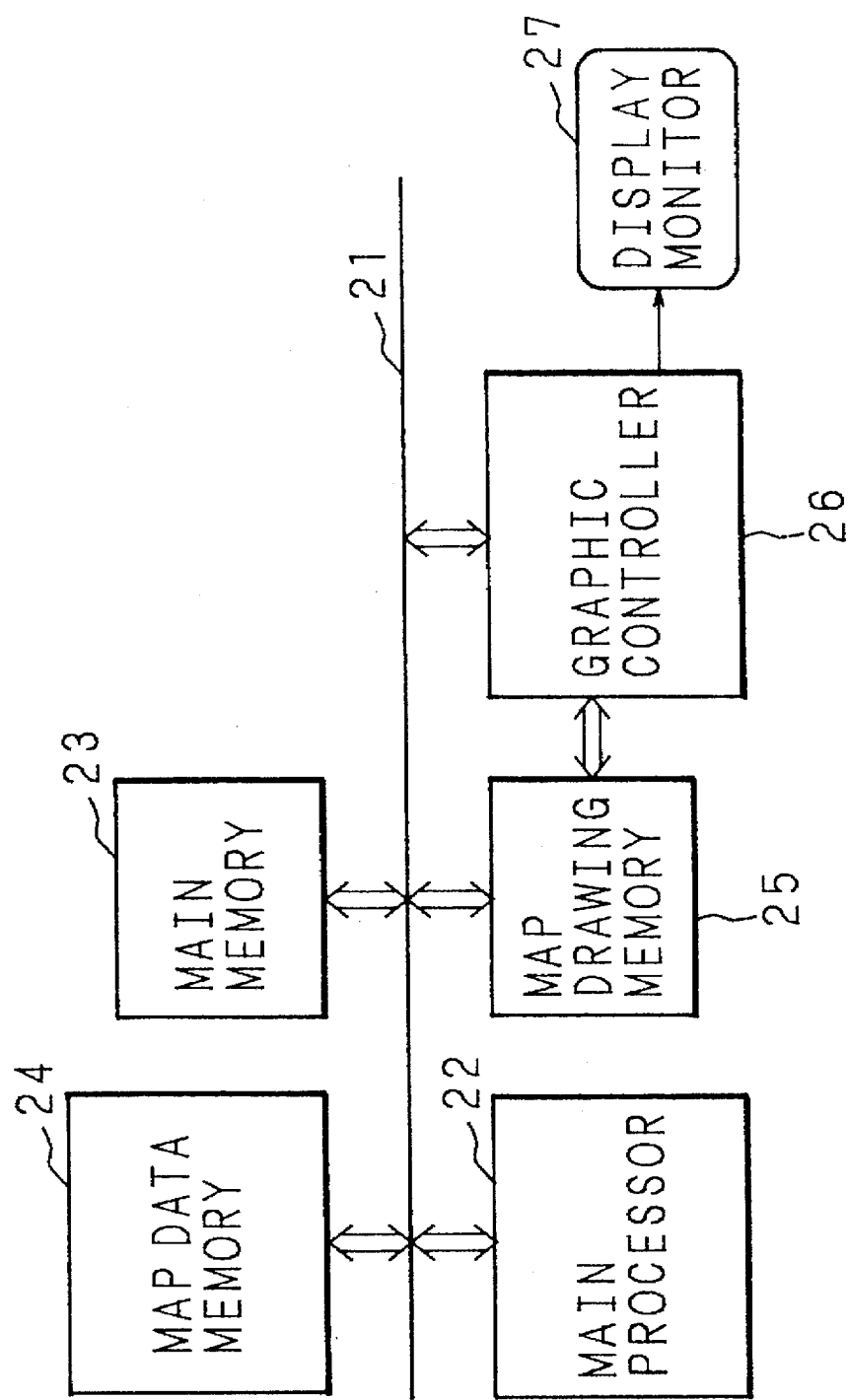
FIG. 1 is a diagram showing the configuration of a prior art navigation apparatus.
Figure 2:
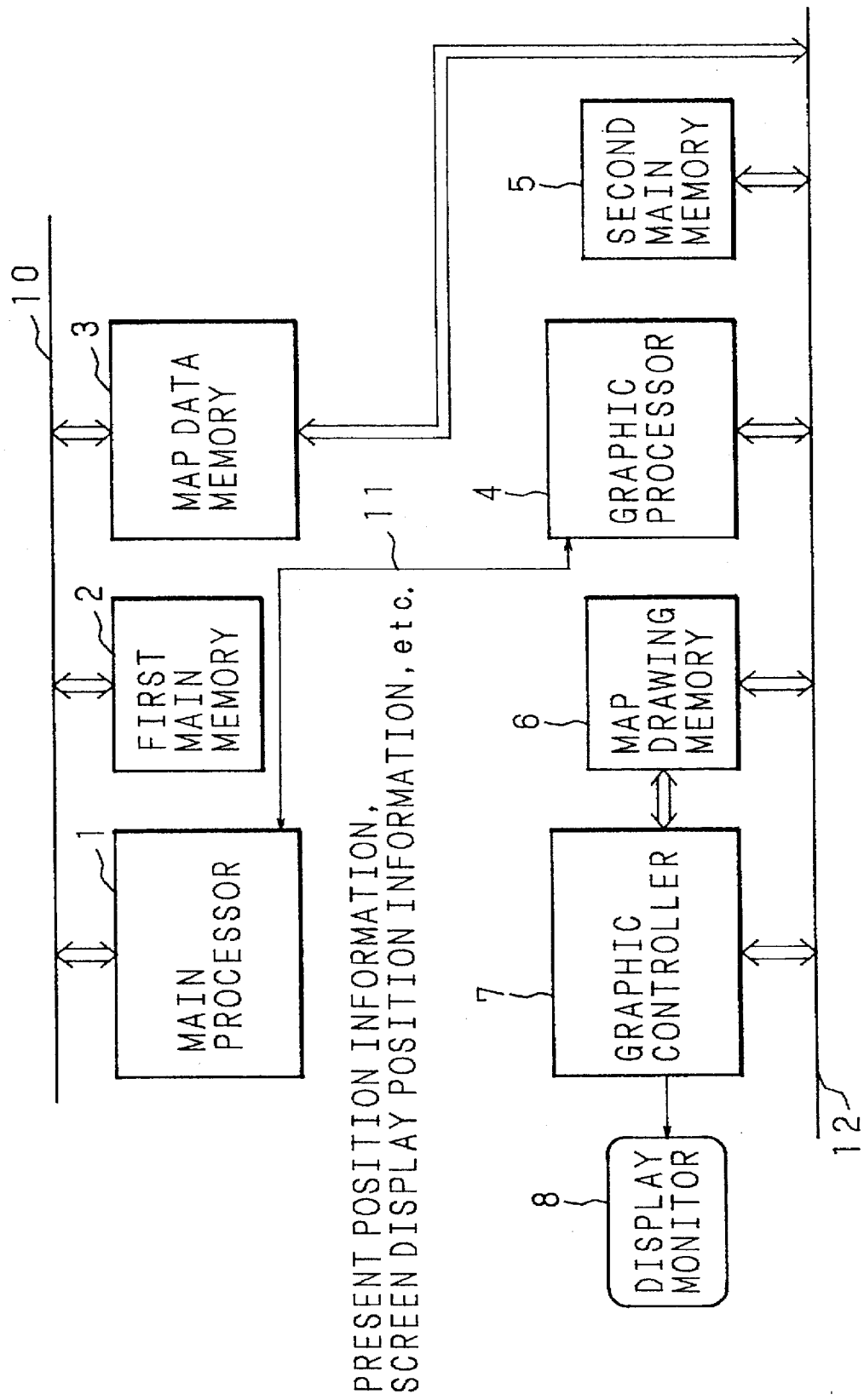
FIG. 2 is a diagram showing the configuration of a navigation apparatus of a first embodiment.

FIG. 2 is a diagram showing the configuration of a navigation apparatus of a first embodiment (first example). In FIG. 2, 10 designates a data bus at the main processor side to which a main processor (first processor) 1, a first main memory 2, and a map data memory 3 are connected. The main processor 1 performs a process of specifying the present position of the vehicle, that of searching for the route, etc. The map data memory 3 is an external memory such as a CD-ROM, or an IC card which stores a large number of map data. A graphic processor (second processor) 4 is connected to the main processor 1 through a serial communication line 11. Drawing attribute data (present position information, etc.), and scroll attribute data (screen display position information, etc.) required for performing a scroll process are transmitted from the main processor 1 through the serial communication line 11. The graphic processor 4 performs the map drawing process and the scroll process on the basis of data sent from the main processor 1.

In FIG. 2, 12 designates a data bus at the graphic processor side to which the map data memory 3, the graphic processor 4, a second main memory 5, a map drawing memory 6, and a graphic controller 7 are connected.

When the map which is currently drawn is to be updated, the graphic processor 4 captures necessary map data from the map data memory 3, sends the map data to the second main memory 5, and draws a map in the map drawing memory 6 on the basis of the map data. The graphic controller 7 captures the map information drawn in the map drawing memory 6, and supplies the information to a display monitor 8 so that the map is displayed on the display monitor 8.

Next, the operation will be described. The main processor 1 sends to the graphic processor 4 through the serial communication line 11 the following: the present position information captured by processing various kinds of information which is obtained from the GPS, a vehicle speed sensor, a gyrocompass, a key input unit, or the like, by using the first main memory 2; map size information for specifying the size (scale) of the map to be drawn; and, when the display screen scroll is to be executed in response to a key operation, the screen display position information. The present position information and the map size information are drawing attribute data. The screen display position information is scroll attribute data, and specifically includes the start position of the scroll, and the direction, frequency, and amount of the scroll. In the case where the screen is judged to be scrolled, on the basis of the present position information of the vehicle and, during a period when the scroll is executed, the screen display position information, the graphic processor 4 updates the map screen display and display start position of the graphic controller 7, thereby performing the scrolling of the screen. When the map which is currently drawn is to be updated, the graphic processor 4 captures necessary map data from the map data memory 3, sends the data to the second main memory 5, and then performs the map screen drawing process so that the map is drawn in the map drawing memory 6.

As described above, in the first example, both the main processor 1 and the graphic processor 4 can access the map data memory 3. The graphic processor 4 is enabled to perform all processes related to a map (selection of a map to be displayed corresponding to the present position, reading of map data, drawing a map, scrolling of a map, and the like) by only transmitting the present position information, the screen display position information, etc. from the main processor 1.

Consequently, the main processor 1 is required only to transmit the present position information, the screen display position information, etc., so that the graphic processor 4 performs the map drawing process and the map scroll process. As compared with the prior art apparatus, therefore, the load of the main processor 1 (selection of a map to be displayed corresponding to the present position, reading of map data, drawing a map, scrolling of a map, and the like) can be reduced.

[Second Embodiment]

Figure 3:
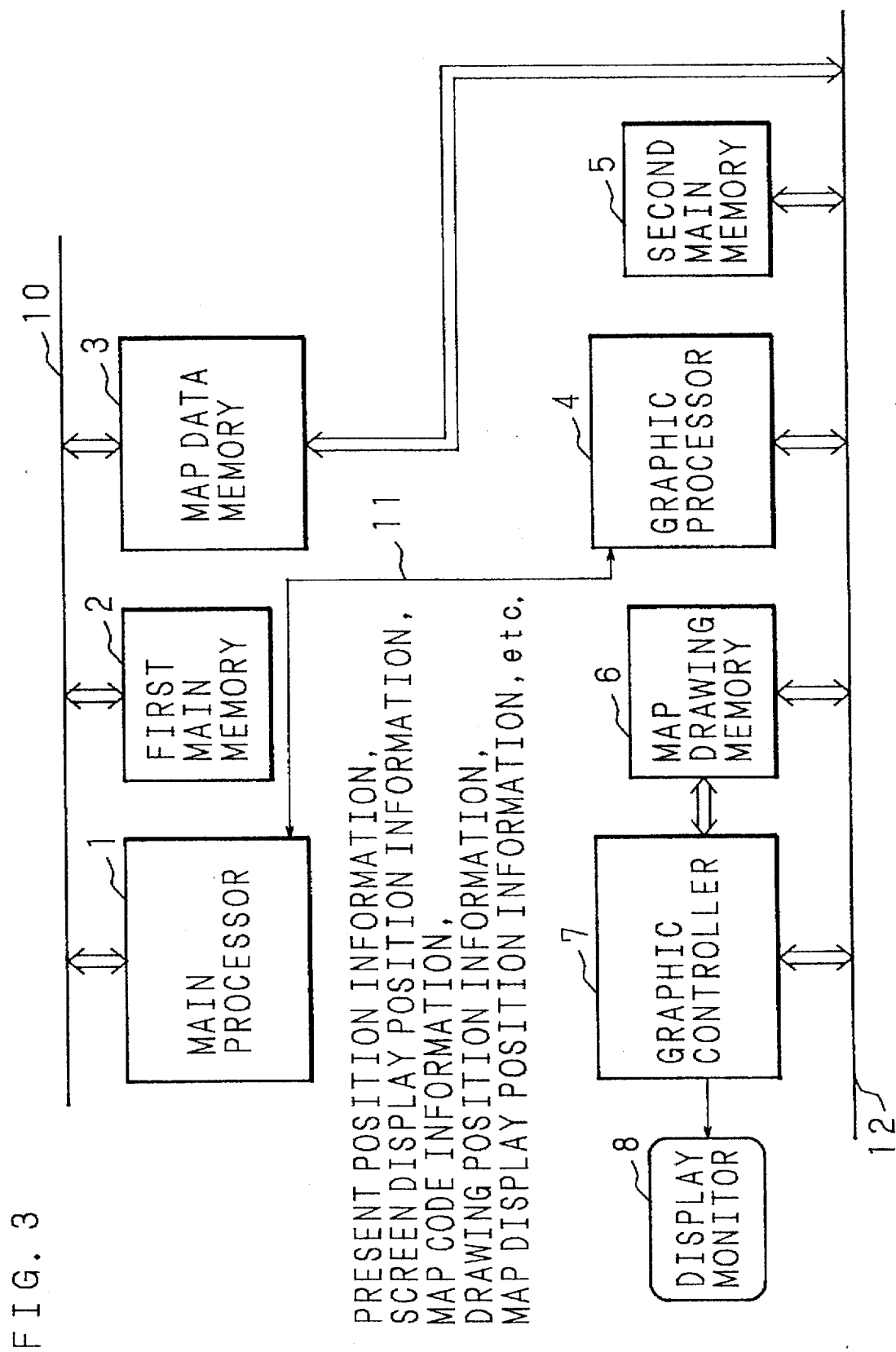
FIG. 3 is a diagram showing the configuration of a navigation apparatus of a second embodiment.

FIG. 3 is a diagram showing the configuration of a navigation apparatus of a second embodiment (second example). In FIG. 3, the components which are the same as or similar to those of FIG. 2 are designated by the same reference numerals. The configuration of the second example shown in FIG. 3 is similar to that of the first example shown in FIG. 2. In the same manner as the first example, the graphic processor 4 performs the map drawing process and the map scroll process, and the main processor 1 performs other processes. However, the contents of the communication data sent from the main processor 1 to the graphic processor 4 through the communication line 11 are different from those in the first example.

Next, the operation will be described. In the same manner as the first example, the main processor 1 sends the present position information, the map size information, and, when the display screen scroll is to be executed in response to a key operation, the screen display position information, to the graphic processor 4 through the serial communication line 11. The main processor 1 performs also the management of a map which is to be displayed at present, and that of a map which is to be displayed at a future time. When there exists a map which is to be displayed at a future time, the main processor 1 transmits to the graphic processor 4 also map code information indicative of the code of the corresponding map, drawing position information indicative of a drawing position in the map drawing memory 6, and map display position information indicative of the position of displaying the map on the display monitor 8.

In the case where the screen is judged to be scrolled, on the basis of the present position information of the vehicle and, during a period when the scroll is executed, the screen display position information, the graphic processor 4 updates the map screen display and display start position of the graphic controller 7, thereby performing the scrolling of the screen. When a transmittance indicating that the currently drawn map is to be updated is inputted from the main processor 1, the graphic processor 4 captures map data designated on the basis of the map code information, from the map data memory 3, sends the data to the second main memory 5, and then performs the map screen drawing process so that the map is drawn at a position of the map drawing memory 6 which is designated by the drawing position information.

As described above, in the second example, both the main processor 1 and the graphic processor 4 can access the map data memory 3. The graphic processor 4 is enabled to perform most of processes related to a map (reading of map data, drawing a map, scrolling of a map, and the like) by only transmitting the present position information, the screen display position information, the map code information, the drawing position information, the map display position information, etc. from the main processor 1 which manages the present position and the map.

Consequently, the main processor 1 is required only to transmit drawing attribute data and scroll attribute data of the above-described kinds, so that the graphic processor 4 performs the map drawing process and the map scroll process. As compared with the prior art apparatus, therefore, the load of the main processor 1 (reading of map data, drawing a map, scrolling of a map, and the like) can be reduced.

[Third Embodiment]

Figure 4:
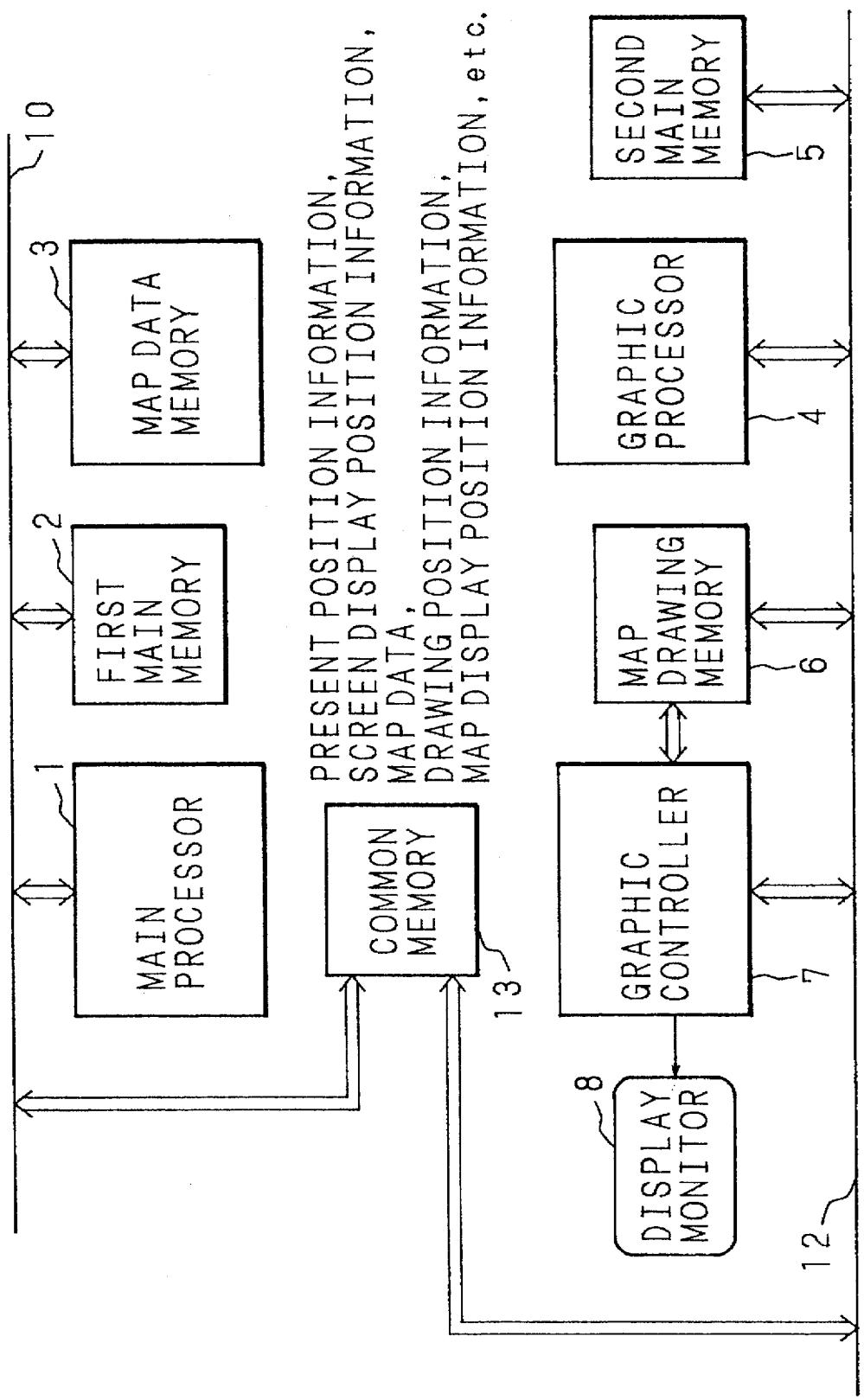
FIG. 4 is a diagram showing the configuration of a navigation apparatus of a third embodiment.

FIG. 4 is a diagram showing the configuration of a navigation apparatus of a third embodiment (third example). In FIG. 4, 10 designates a data bus at the main processor side to which a main processor (first processor) 1, a first main memory 2, a map data memory 3, and a common memory 13 are connected. 12 designates a data bus at the graphic processor side to which a graphic processor (second processor) 4, a second main memory 5, a map drawing memory 6, a graphic controller 7, and the common memory 13 are connected. In FIG. 4, the components which are the same as or similar to those of FIG. 2 are designated by the same reference numerals.

The common memory 13 temporarily stores drawing attribute data and scroll attribute data sent from the main processor 1 to the graphic processor 4. Unlike the first and second examples described above, the third example is not provided with the communication line 11. The drawing attribute data and scroll attribute data are sent from the main processor 1 to the graphic processor 4 by writing the data into and reading from the common memory 13. The contents of the data to be sent are different from those of the data in the first and second examples.

Next, the operation will be described. The main processor 1 sends to the common memory 13 data similar to those in the first example, i.e., the present position information, the map size information, and, when the display screen scroll is to be executed in response to a key operation, screen display position information, and the data are stored in the common memory 13. The main processor 1 performs also the management of a map which is to be displayed at present, and that of a map which is to be displayed at a future time. When there exists a map which is to be displayed at a future time, the main processor 1 captures corresponding map data from the map data memory 3, and sends the captured map data, drawing position information indicative of a drawing position in the map drawing memory 6, and map display position information indicative of the position of displaying the map on the display monitor 8, to the common memory 13 so that also the data are stored in the common memory 13.

In the case where the screen is judged to be scrolled, on the basis of the information stored in the common memory 13, i.e., the present position information of the vehicle and, during a period when the scroll is executed, the screen display position information, the graphic processor 4 updates the map screen display and display start position of the graphic controller 7, thereby performing the scroll of the screen. When map data are stored in the common memory 13, the graphic processor 4 captures the map data from the common memory 13, sends the data to the second main memory 5, and then performs the map screen drawing process so that the map is drawn at a position of the map drawing memory 6 which is designated by the drawing position information.

As described above, in the third example, the common memory 13 is disposed between the main processor 1 and the graphic processor 4, and the main processor 1 captures map data of the map data memory 3. The graphic processor 4 is enabled to perform most of the processes related to a map (drawing a map, scrolling of a map, and the like) by only transferring the present position information, the screen display position information, the map data, the drawing position information, the map display position information, etc. from the main processor 1 which manages the present position and the map, to the common memory 13.

Consequently, the main processor 1 is required only to transfer drawing attribute data and scroll attribute data of the above-described kinds to the common memory 13, so that the graphic processor 4 performs the map drawing process and the map scroll process. As compared with the prior art apparatus, therefore, the load of the main processor 1 (drawing a map, scrolling of a map, and the like) can be reduced.

[Fourth Embodiment]

FIG. 5 is a diagram showing the configuration of a navigation apparatus of a fourth embodiment (fourth example). In FIG. 5, 10 designates a data bus at the main processor side to which a main processor (first processor) 1, a first main memory 2, and a map data memory 3 are connected. 12 designates a data bus at the graphic processor side to which a graphic processor (second processor) 4, a second main memory 5, a map drawing memory 6, and a graphic controller 7 are connected. In FIG. 5, the components which are the same as or similar to those of FIG. 2 are designated by the same reference numerals.

The configuration of fourth example shown in FIG. 5 is different from that of the above-described first and second examples shown in FIGS. 2 and 3 in that the graphic processor 4 cannot access the map data memory 3. Furthermore, the contents of communication data sent from the main processor 1 to the graphic processor 4 through the communication line 11 are different from those in the first and second examples.

Next, the operation will be described. In the same manner as the first example, the main processor 1 sends the present position information, the map size information, and, when the display screen scroll is to be executed in response to a key operation, the screen display position information, to the graphic processor 4 through the serial communication line 11. The main processor 1 performs also the management of a map which is to be displayed at present, and that of a map which is to be displayed at a future time. When there exists a map which is to be displayed at a future time, the main processor 1 captures corresponding map data from the map data memory 3, and transmits the captured map data, drawing position information indicative of a drawing position in the map drawing memory 6, and map display position information indicative of the position of displaying the map on the display monitor 8, to the graphic processor 4.

In the case where the screen is judged to be scrolled, on the basis of the present position information of the vehicle and, during a period when the scroll is executed, the screen display position information, the graphic processor 4 updates the map screen display and display start position of the graphic controller 7, thereby performing the scroll of the screen. When map data are transmitted from the main processor 1, the graphic processor 4 sends the map data to the second main memory 5, and then performs the map screen drawing process so that the map is drawn at a position of the map drawing memory 6 which is designated by the drawing position information.

As described above, in the fourth example, the main processor 1 captures map data of the map data memory 3. The graphic processor 4 is enabled to perform most of the processes related to a map (drawing a map, scrolling of a map, and the like) by only transmitting the present position information, the screen display position information, the map data, the drawing position information, the map display position information, etc. from the main processor 1 which manages the present position and the map, to the graphic processor 4 through the communication line 11.

Consequently, the main processor 1 is required only to transmit drawing attribute data and scroll attribute data of the above-described kinds, so that the graphic processor 4 performs the map drawing process and the map scroll process. As compared with the prior art apparatus, therefore, the load of the main processor 1 (drawing a map, scrolling of a map, and the like) can be reduced.

In the examples described above, as far as an interface adequate for the graphic processor 4 is used, a processor of any kind may be used as the main processor 1. The type of the main processor 1 is not required to be the same as that of the graphic processor 4, and any combination of the processors may be employed. The fourth example in which the processors are not required to access the same memory has the highest degree of freedom of selection of the processors.

In the first, second, and fourth examples, the main processor 1 and the graphic processor 4 are connected to each other through the serial communication line 11. Alternatively, the processors may be connected to each other through a data bus.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A navigation apparatus which draws and displays a map on the basis of a stored map data, said apparatus comprising:
   a first processor which outputs drawing attribute data for drawing the map, and scroll attribute data for scrolling the map; and
   a second processor which receives the drawing attribute data and the scroll attribute data from said first processor, and performs a map drawing process and a map scroll process based on the drawing attribute data and the scroll attribute data.

2. A navigation apparatus according to claim 1, wherein said apparatus further comprises a map data memory which stores the map data, and which can be accessed by both of said first and second processors.

3. A navigation apparatus according to claim 1, wherein the drawing attribute data include present position information for specifying a present position, and map size information for specifying a size of the map to be drawn, and the scroll attribute data include screen display position information having information of a start position of a scroll, a direction of the scroll, and an amount of the scroll.

4. A navigation apparatus according to claim 1, wherein the drawing attribute data include present position information for specifying a present position, map size information for specifying a size of the map to be drawn, and information of a map which is to be drawn at a future time and the scroll attribute data include screen display position information having information of a start position of a scroll, a direction of the scroll, and an amount of the scroll.

5. A navigation apparatus according to claim 1, wherein said apparatus further comprises a serial communication line through which the drawing attribute data and the scroll attribute data are transmitted from said first processor to said second processor.

6. A navigation apparatus according to claim 1, further comprising:
   a first bus connected to said first processor; and
   a second bus connected to said second processor.

7. A navigation apparatus according to claim 6, further comprising a first main memory and a map data memory connected to said first bus.

8. A navigation apparatus according to claim 6, further comprising a second main memory, a graphic controller and a map drawing memory connected to said second bus.

9. A navigation apparatus which draws and displays a map on the basis of stored map data, said apparatus comprising:
   a map data memory which stores the map data;
   a first processor which outputs map data read out from said map data memory, drawing attribute data for drawing the map, and scroll attribute data for scrolling the map;
   a common memory which stores the outputted map data, drawing attribute data, and scroll attribute data; and
   a second processor which performs a map drawing process and a map scroll process on the basis of data stored in said common memory.

10. A navigation apparatus according to claim 9, wherein the drawing attribute data include present position information for specifying a present position, map size information for specifying a size of the map to be drawn, and information of a map which is to be drawn at a future time, and the scroll attribute data include screen display position information having information of a start position of a scroll, a direction of the scroll, and an amount of the scroll.

11. A navigation apparatus which draws and displays a map on the basis of stored map data, said apparatus comprising:
   a map data memory which stores the map data;
   a first processor which outputs map data read out from said map data memory, drawing attribute data for drawing the map, and scroll attribute data for scrolling the map; and
   a second processor which receives the outputted map data, drawing attribute data, and scroll attribute data, and performs a map drawing process and a map scroll process on the basis of the received data.

12. A navigation apparatus according to claim 11, wherein the drawing attribute data include present position information for specifying a present position, map size information for specifying a size of the map to be drawn, and information of a map which is to be drawn at a future time, and the scroll attribute data include screen display position information having information of a start position of a scroll, a direction of the scroll, and an amount of the scroll.

13. A navigation apparatus according to claim 11, wherein said apparatus further comprises a serial communication line through which the map data, the drawing attribute data, and the scroll attribute data are transmitted from said first processor to said second processor.

* * * * *